United States Patent [19]

Courtney

[11] Patent Number: 5,075,543

[45] Date of Patent: Dec. 24, 1991

[54] LIGHT WEIGHT PAPER SENSOR USING FIBERS

[75] Inventor: John E. Courtney, Macedon, N.Y.

[73] Assignee: Xerox Corporation, Stamford, Conn.

[21] Appl. No.: 529,848

[22] Filed: May 29, 1990

[51] Int. Cl.[5] .............................................. G01V 9/04
[52] U.S. Cl. ............................. 250/223 R; 250/227.11
[58] Field of Search ........... 250/227.11, 223 R, 222.1, 250/559–561, 231.14, 231.16; 340/674, 675; 271/258

[56] References Cited

U.S. PATENT DOCUMENTS

| | | | |
|---|---|---|---|
| 3,450,887 | 6/1969 | Nirenberg | 250/223 R |
| 3,610,940 | 10/1971 | Dunigan | 250/223 R |
| 3,742,486 | 6/1973 | Skidmore | 250/231.14 |
| 4,132,899 | 1/1979 | Shigemasa et al. | 250/577 |
| 4,156,149 | 5/1979 | Vascari | 250/577 |
| 4,242,590 | 12/1980 | van Tlück | 250/577 |
| 4,365,151 | 12/1982 | Fasig et al. | 250/223 R |
| 4,484,070 | 11/1984 | Inoue | 271/258 |
| 4,513,404 | 4/1985 | Huggins | 367/93 |

Primary Examiner—David C. Nelms
Assistant Examiner—S. Allen
Attorney, Agent, or Firm—Ronald F. Chapuran

[57] ABSTRACT

An optical sensor in a sheet transport system for detecting a sheet along a paper path. The sensor includes a light beam disposed in an interference relationship with a paper path, the light beam providing a plurality of crossings of the paper path and including a light emitter, a light detector disposed at the end of the light beam path, the light detector responsive to light projected along the light beam path to provide a signal, the signal providing an indication of the presence or absence of a sheet in the light beam path, and an optical fiber providing a portion of the light beam path for redirecting the light beam across the paper path. The light beam is projected at an angle with respect to the paper path, the angle being at least 10 degrees from the perpendicular to the paper path.

6 Claims, 3 Drawing Sheets

LIGHT WEIGHT PAPER SENSOR USING FIBERS

BACKGROUND OF THE INVENTION

The invention relates to a paper sensor, and more particularly, to a light weight paper sensor.

In machines requiring the movement of sheets of paper in timed sequence, such as printer and reproduction machines, paper jamming often occurs due to improper paper feeding, spacing inaccuracies, and various other factors resulting in the improper deceleration or acceleration of paper sheet speeds in the machine.

The prior art is replete with paper sensing devices to sense the presence of sheets of paper at various points along the path of travel. One type of sensing device takes the form of switches actuated by switch arms located in the path of movement of the sheet. The disadvantages of this type of sensor are the response time of the control to the mechanical actuation of the switch by the paper. Also, the fact that the sheet of paper must contact a switch arm itself may effect the travel of the sheet, either retarding the advancement of the sheet or skewing the sheet out of the predetermined path.

Other types of detection devices teach the use of a plurality of ultrasonic detecting devices dispersed along the path. Each of the detecting devices includes an ultrasonic transmitting transducer for generating ultrasonic waves of a predetermined wavelength and an ultrasonic receiving transducer to receive the transmitted waves. The acoustically vibrating element in each of the transducers is generally a piezoelectric material for converting electrical signals to mechanical vibrations or mechanical vibrations to elecrical signals. The detection devices are arranged along the paper path and circuit means monitor in timed sequence the effect upon each of the detection devices as sheets are transported.

Other sensors teach the use of a hollow tube attached to a speaker. In operation, the speaker is driven at constant frequency and the acoustical impedance of the hollow tube is measured by measuring the electrical impedance of the speaker. When a document moves along the paper path and covers one end of the hollow tube, the acoustical impedance and thus the electrical impedance is changed. A difficulty with this type of system and other prior art systems is that it is necessary to provide a separate transmitter and/or receiver along each port or location of the paper path where it is desired to sense the presence or absence of a sheet of paper. This can be relatively complicated and expensive.

One of the problems with most of the paper path sensors that are used today is the inability to respond well to papers of light weight. Because of the thinness of the paper, it is very easy for the light from an optical sensor to go through the paper and be received by a detector. With a mechanical switch it is easy for the paper to be deflected and not trip the switch because the paper is not very stiff. One attempt to solve this problem is described in IBM Technical Disclosure Bulletin, vol. 22 No. 4, September 1979 showing an LED light source beam broken twice by the same document before the beam is detected by a phototransistor. However, because of the mirror or prism reflecting surfaces, it is relatively more difficult to focus the light beam on the paper path target area. Also, the direct impact of the beam on the paper, even though striking the paper twice, generally contributes to the penetration of the light beam through the paper after resulting in an improper detection or paper present signal.

It would be desirable, therefore, to provide a sensor system that overcomes these difficulties in the prior art, and in particular, minimizes the potential for error signals in sheet detection and focuses the light beam on the paper path target area, to be able to detect relatively thin sheets. It is an object of the present invention, therefore, to provide a new and improved optical, thin sheet detector that sufficiently blocks the light path to the detector to signal the presence of a sheet in the paper path. It is another object of the present invention to provide an angled path of the light beam to the paper or sheet and to provide an optical fiber in the light path to focus the light onto the target area. Further advantages of the present invention will become apparent as the following description proceeds and the features characterizing the invention will be pointed out with particularity in the claims annexed to and forming a part of this specification.

SUMMARY OF THE INVENTION

Briefly, the present invention is an optical sensor in a sheet transport system for detecting a sheet along a paper path comprising a light beam path, the light beam path disposed in an interference relationship with the paper path, the light beam providing a plurality of crossings of the paper path, a light emitter, the light emitter disposed at one end of the light beam path for projecting a light beam along the light beam path, a light detector disposed at the end of the light beam path, the light detector responsive to light projected along the light beam path to provide a signal, the signal providing an indication of the presence or absence of a sheet in the light beam path, and an optical fiber providing a portion of the light beam path for redirecting the light beam across the paper path, the light beam path being projected at an angle with respect to the paper path, the angle being at least 10 degrees from the perpendicular to the paper path.

DESCRIPTION OF THE DRAWINGS

For a better understanding of the present invention, reference may be had to the accompanying drawings wherein the same reference numerals have been applied to like parts and wherein.

DETAILED DESCRIPTION OF THE INVENTION

Figure 1:
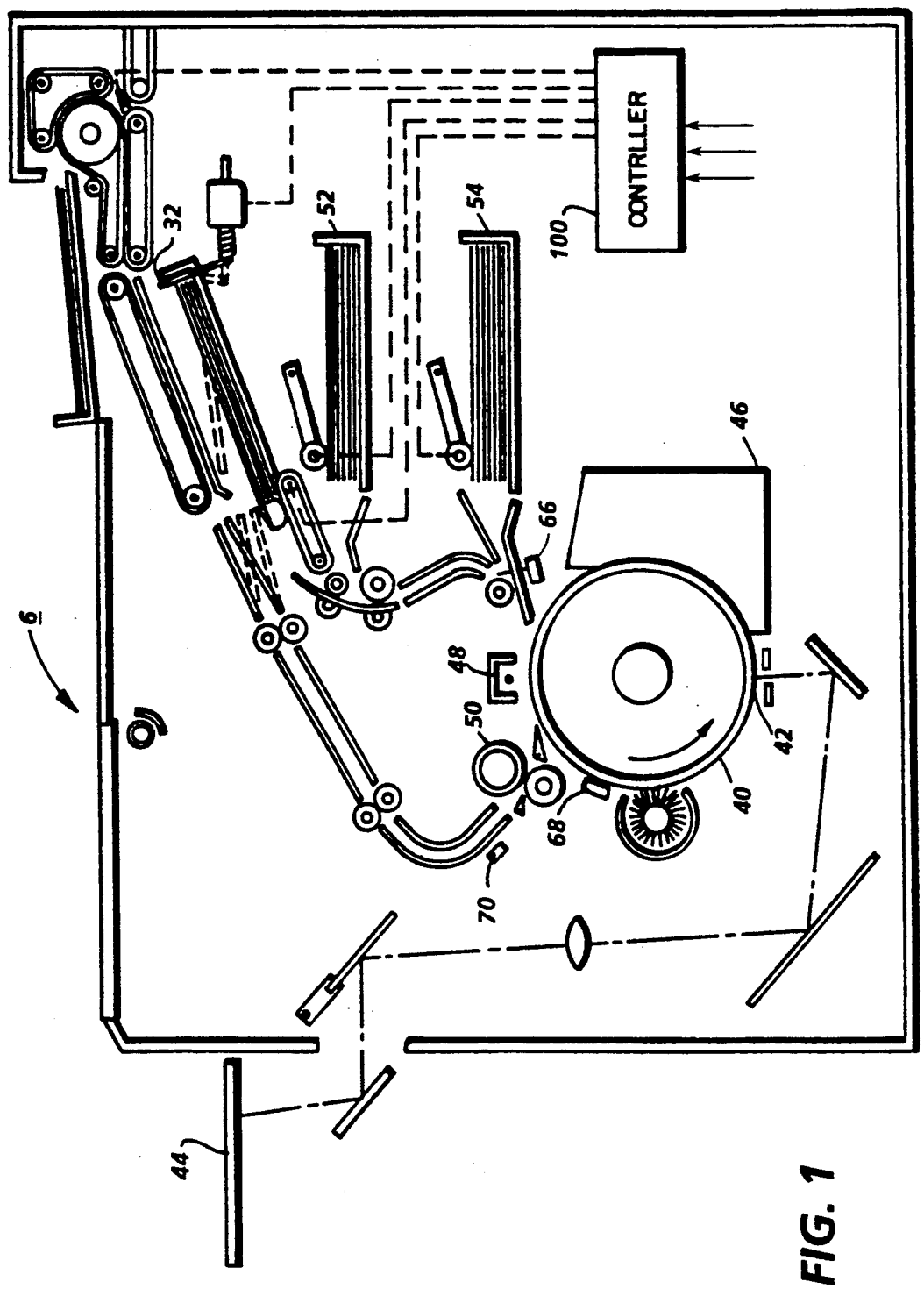
FIG. 1 illustrates a typical machine environment incorporating the present invention.

With reference to FIG. 1 there is illustrated a printing machine 6 incorporating the present invention. In particular, there is shown a photoreceptor 40 rotating in a counterclockwise direction. The photoreceptor 40 rotates through an optic station 42 for projecting an image of an object on platen 44 onto the photoreceptor surface. The photoreceptor then rotates to a developing station 46 and then to a transfer station 48 to transfer the toner image to one side of a copy sheet. The copy sheet with the toner image is then fused at the fusing station 50. Copy sheets are provided from one of two copy sheets trays 52 or 54. Copy sheet detectors are disposed along the copy sheet path at various location, detectors 66, 68 and 70 being representative. The detectors are electrically connected to the controller 100.

In operation, as the copy sheets from either tray 52 or 54 are conveyed along the paper path, past detector 66 prior to image transfer to transfer station 48. After transfer, the copy sheet is delivered to fuser 50 and then conveyed past detector 70. A copy sheet that fails to be guided into the fuser 50 and remains on the photoreceptor is sensed by detector 68. It should be noted that various port locations could be provided throughout the machine to detect the presence or absence of any type of obstruction.

Figure 2:
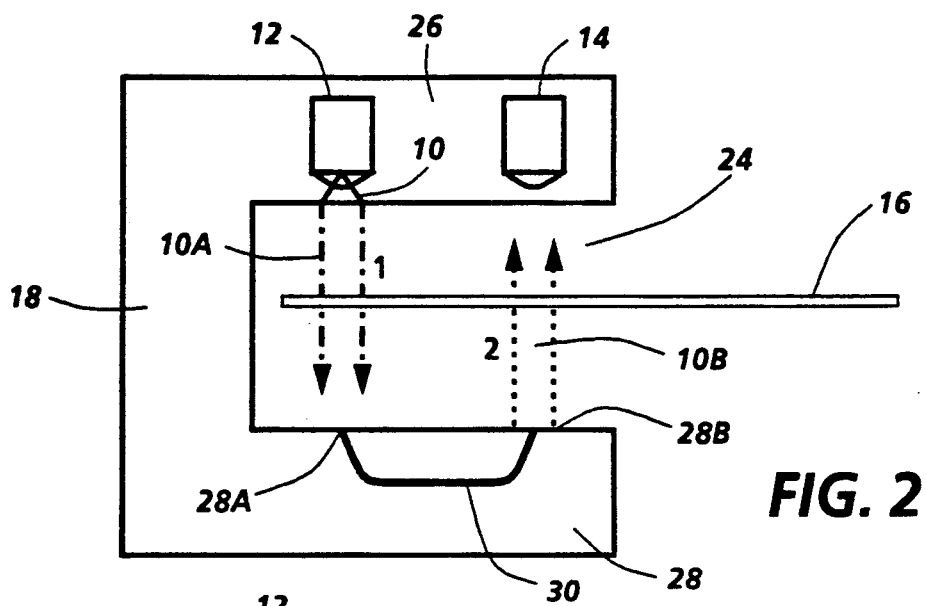
FIG. 2 illustrates one embodiment of the sensor of the present invention.

With reference to FIG. 2, in one embodiment of the present invention, a light beam 10 from LED (light emitting diode) light source 12 is projected to a phototransistor or detector 14. Two portions 10A and 10B of light beam 10 are broken by the document 16 to minimize an erroneous indication that a document is not present given off by the detector 14 due to the light transmittance through pinholes of the document 16 or due to the low opacity of the material of document 16. In other words, light beam 10 is twice broken by the document 16 at 10A and 10B to minimize an incorrect reading from the detector 14.

LED light source 12 and detector 14 are preferably secured or nested in a housing 18 that is suitably secured to a not shown machine frame. As illustrated in FIG. 2, the document 16 moves in a path into or out of the paper in the space 24 disposed between the extending legs 26 and 28 of the housing 18. An optical fiber 30 provides the optical link within the leg 28 for receiving the light beam 10A at point 28A of leg 28 and exiting the light beam 10B at point 28B of leg 28 toward the detector 14. It should be noted that a mask could be suitably located within the opening 24 to further direct the light beam 10 from the LED 12 to the optical fiber 30 and from the fiber 30 to the detector 14.

As illustrated, the optical fiber 30 suitably redirects or folds back the light beam into the space 24 to provide the second portion of the beam 10B that is broken or blocked by the presence of a document 16 between the legs 26 and 28. The advantages of this u-joint or redirection path is that the optical fiber reduces crosstalk between the LED 12 and detector 14 since the fiber 30 allows for the separation of the emitter and detector to any desired spacing. Another advantage is that the optical fiber 30 can be very small and thus produce a high resolution for a break or trip point of the document.

In general, the sensor can detect a trailing edge or leading edge of a document 16 as it moves in the document path into an interference relationship with the light beam 10. When either portion of the beam 10A or 10B is blocked by the document 16, the detector 14 senses the document. The light from the LED light source 12 redirected by the optical fiber 30 to the detector 14 when a document is not in a position to block beam portions 10A and 10B, thus resulting in a high photocurrent output from the detector 14. Light beam 10A striking the document 16 and light beam 10B striking document 16 causes the diffusion of the light so that a much smaller portion of light reaches the detector 14 even if very thin paper is used for document 16, thus indicating the presence of a document. False errors due to random holes or pinholes in a document are minimal since the light beam in its two portions 10A and 10B ordinarily passes through two different areas of a document in reaching the detector 14 from LED 12.

Figure 3:
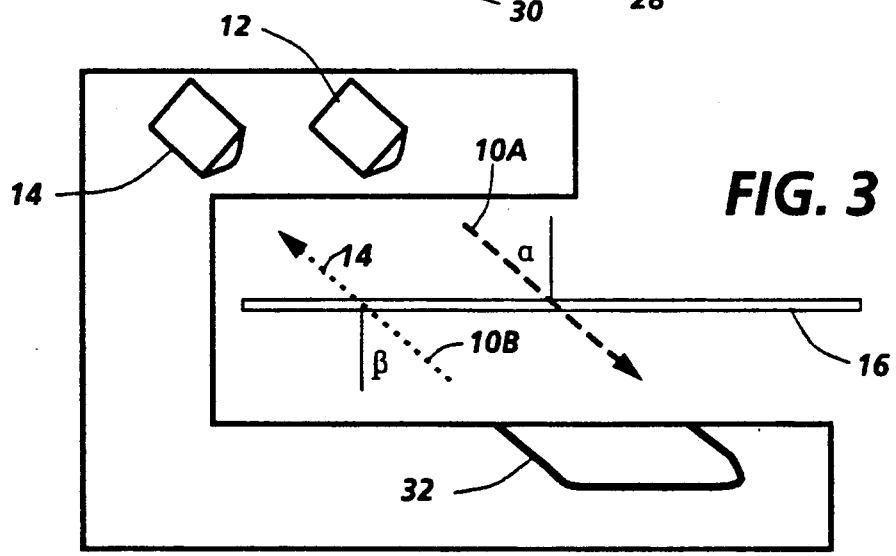
FIG. 3 illustrates another embodiment of the sensor of the present invention.
Figure 4:
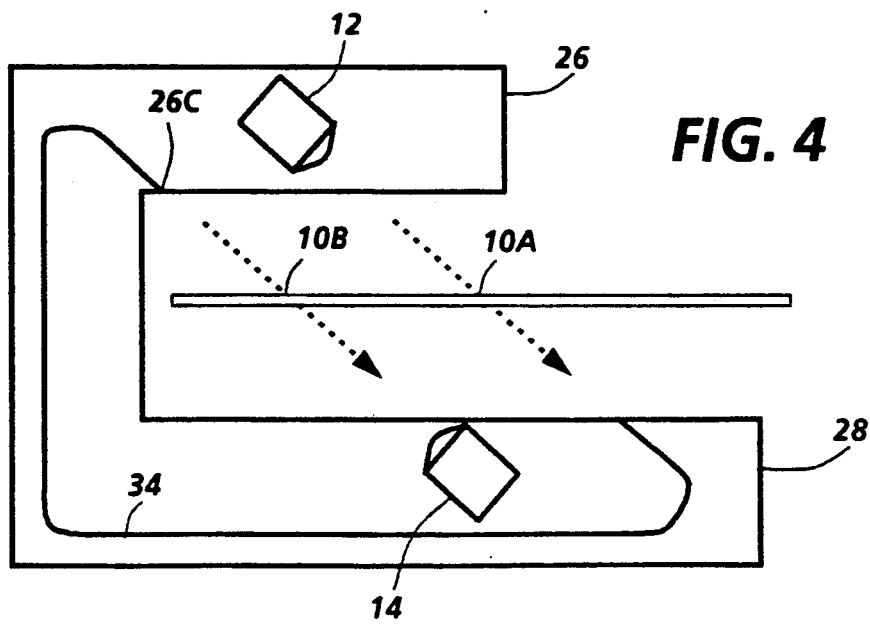
FIG. 4 illustrates still another embodiment of the sensor of the present invention.

With reference to FIGS. 3 and 4 there are illustrated further embodiments of the present invention. In FIGS. 3 and 4 both the LED 12 and detector 14 are illustrated with respect to the document or paper in the paper path. Again an optical fiber loop 32 is illustrated to bend the light beam from the LED back to the detector, and in this case, is positioned to be in line with the LED 12 and detector 14. FIG. 4 is similar to FIG. 3 except that the detector 14 is shown positioned at the bottom leg 28 of the housing and the fiberoptic 34 extends from leg 28 to leg 26, terminating at a position 26C to project the light beams 10B toward the photodetector 16. It should be noted that various placements of the LED and detector are contemplated within the scope of this invention, and that in particular, an optical fiber or light pipe provides a variety of segments of the light beam to redirect the light beam. The redirected light beam provides the multiple paths of the light beam in an interference relationship with the document or paper path.

In accordance with another feature of the present invention, in FIGS. 3 and 4 the light beam 10, in particular portions 10A and 10B are directed at an angle with respect to the normal to the paper or document 16. In other words, with reference to FIG. 2, light beam portions 10A and 10B are projected perpendicular to the document 16. In FIGS. 3 and 4, beam portions 10A and 10B are on angles with respect to this perpendicular to the document 16. The advantage of this orientation and placement of the LED and detector, and in particular the light beam 10 with respect to the document 16, is to significantly reduce the amount of light transmitted back to detector 14 with a document in blocking the light beam path.

In systems such as disclosed in FIG. 2, as generally shown in the prior art, a difficulty has been that with the light beam perpendicular to the document 16, sufficient light from the source is able to project through the paper with enough strength to provide a reading at the detector as if no paper were present.

With reference to FIG. 3, in accordance with the present invention, the LED 12 is disposed at an angle such that the light beam 10A strikes the paper or document 16 at an angle $\alpha$ with respect to the normal or perpendicular to the paper 16. In addition, the light beam 10A is gathered by the fiberoptic loop 32 and rerouted back toward to the paper path such that the light beam 10B exiting from the fiberoptic loop 32 strikes the paper 16 at an angle $\beta$ with respect to the normal or perpendicular to the paper. Many embodiments of the use of a fiberoptic loop and an angled beam path are contemplated within the scope of the present invention. For example, FIG. 4 illustrates the LED 12 in the upper leg 26 of the sensor device and the detector 14 located in the lower leg 28. The fiberoptic 34 completes the optical path of the beam 10A from the lower leg 28 to the upper leg 26 of the device, exiting at point 26C to provide the second beam path 10B in interference with a document sheet or paper. Both beams 10A and 10B are at suitable angles with respect to the paper or the normal to the paper.

Figure 5:
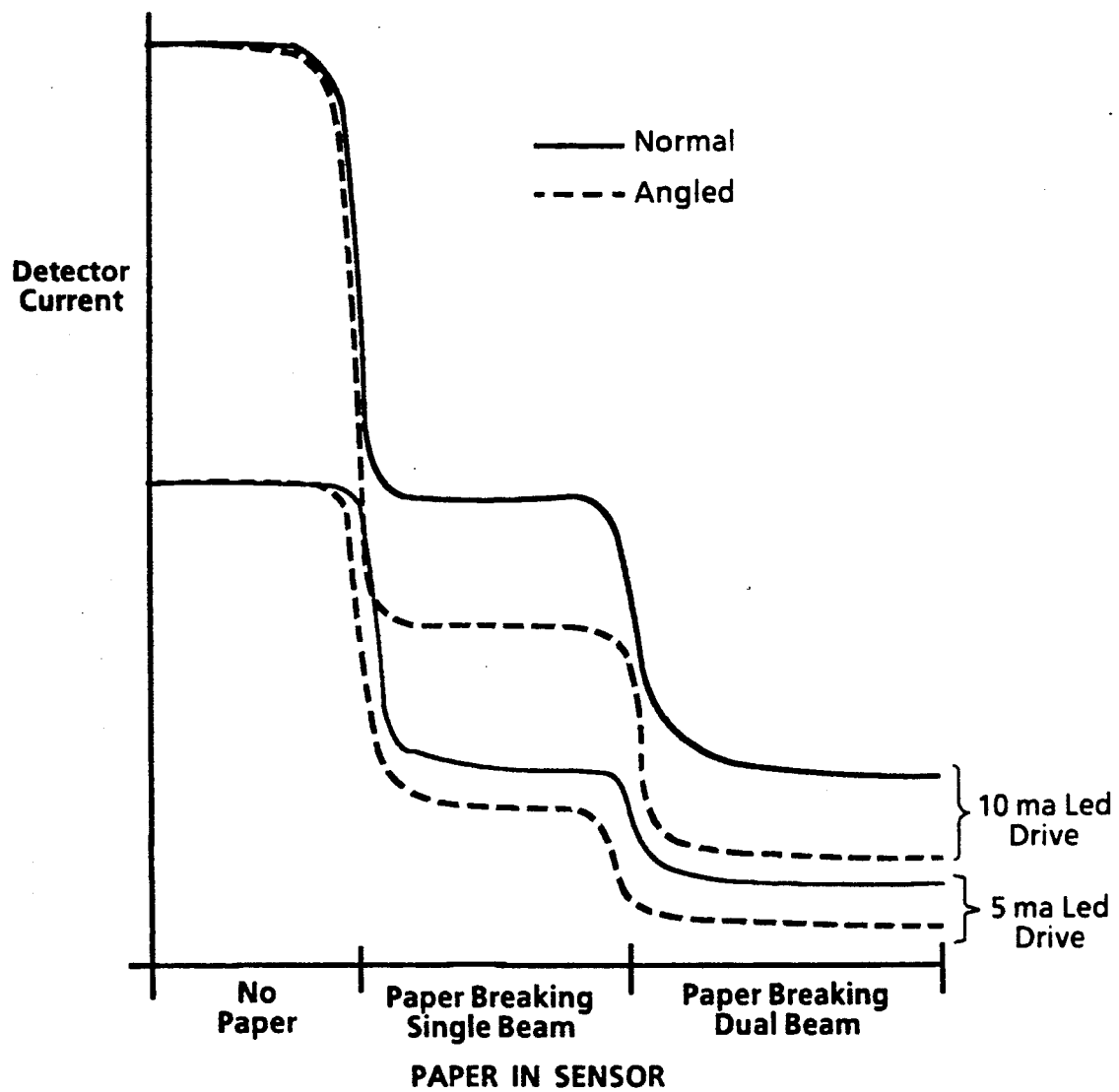
FIG. 5 illustrates the detector current with the beam normal to the paper and with the beam at an angle with respect to the normal to the paper in accordance with the present invention.

FIG. 5 illustrates the advantages of an angled beam with respect to the normal to the document or sheet compared to a light beam at an angle directly perpendicular to the document or paper. The ordinate or y-axis of FIG. 5 illustrates the detector current, that is, the current detected or provided by the detector in response to the degree of light received. The abscissa or x-axis is a plot of the relative spacing of the paper to the detector. There are four curves plotted, the top two curves labeled 10 ma are a plot of the detector current in response to an LED current of 10 ma at an angle normal to the paper and at an angle offset from the normal to the paper. The lower two curves are a plot of the detector current as a function of an LED current of 5 ma at an angle normal to the paper and at an angle offset from the normal to the paper. Ideally, it is desirable to have a relatively high detector current with no paper present and a relatively low, approaching zero, detector current with paper present in the paper path in an interference relationship with the light beam.

As illustrated in FIG. 5, with an LED current of 10 ma for both curves there is a drop of detector current from at the interference of the document with beam 10A and a further drop when the light beam is again further interrupted by the copy sheet in interference with beam 10B. As illustrated, however, the drop is much more significant for the angled beam than for the directly normal beam. For an LED current of 5 ma, the detector current is shown to drop in 2 increments for the paper breaking the single beam and for breaking the dual beam. As illustrated, however, the drop is much more significant for the angled beam than for the directly normal beam. With reference to FIG. 5, there is illustrated the dectector current for both a 10 milliamp (ma) LED and a 5 ma milliamp. LED current wherein the light beam is at the normal to the paper and is at an angle of 60 degrees with respect to the normal to the paper as illustrated in FIGS. 3 and 4.

By comparison of the curves, it is clearly shown that with a 10 ma LED current, the angling of the beam path with respect to the normal to the paper results in an overall drop of the detector current to a much lower level than for the no-angled version. In addition, the 5 ma LED current version also illustrates a much greater drop of detector current for the angled version as opposed to a drop of the directly perpendicular version. This additional drop in detector short circuit current is significant in assuring that the detector does not erroneously detect or respond to a sufficient amount of light to indicate paper present when in fact there is no paper present in the sheet path. The illustration in FIG. 5, as stated, was demonstrated with the beam path at an angle of 60° with respect to the normal to the paper path or 30° with respect to the paper path. It can be seen that the overall drop much quickly approaches a zero level detector short circuit output using the angle version rather than the direct perpendicular version. The closer that the detector current approaches zero with paper present, the less likelihood there is of enough current providing and erroneous reading or indication.

It should be noted that the preferred angle is in the range of 10° to 45° degrees from the plane of the paper. The reason is that the light will be more effectively reflected from the paper at these angles (more spectral component) to further reduce the amount of light that is able to be transmitted through the paper. It should also be noted that the redirection of the light can be done with fiber optics as disclosed, but that there are various other means such as reflectance surfaces and prisms to redirect light. The use of fiber optics provides the added benefit of a numerical aperture which acts like a pseudo lens or field of view limitor.

While there has been illustrated and described what is at present considered to be a preferred embodiment of the present invention, it will be appreciated that numerous changes and modifications are likely to occur to hose skilled in the art, and it is intended in the appended claims to cover all those changes and modifications which fall within the true spirit and scope of the present invention.

I claim:

1. A sheet sensor in a sheet transport system for conveying a sheet along a paper path comprising;

a light beam path, the light beam path disposed in an interference relationship with the paper path, the light beam providing a plurality of crossings of the paper path, a light emitter, the light emitter disposed at one end of the light beam path for projecting a light beam along the light beam path, a light detector disposed at the other end of the light beam path, the light detector responsive to light projected along the light beam path to provide a signal, the signal providing an indication of the presence or absence of a sheet in the light beam path, and an optical fiber providing a portion of the light beam path for redirecting the light beam across the paper path, the optical fiber redirecting the light beam for said plurality of crossings, the light beam path being projected at an angle with respect to the paper path, the angle being less than 90 degrees with respect to the paper path.

2. A sheet sensor in a sheet transport system for conveying a sheet along a paper path in an image reproduction system comprising a light beam path, the light beam path disposed in an interference relationship with the paper path, the light beam providing a plurality of crossings of the paper path, a light emitter, the light emitter disposed at one end of the light beam path for projecting a light beam along the light beam path, a light detector disposed at the other end of the light beam path, the light detector responsive to light projected along the light beam path to provide a signal, the signal providing an indication of the presence or absence of a sheet in the light beam path, and an optical fiber providing a portion of the light beam path for redirecting the light beam across the paper path, the optical fiber redirecting the light beam for said plurality of crossings, the light beam path being projected at an angle with respect to the paper path, the angle being greater than 20 degrees from the perpendicular to the paper path.

3. The sensor of claim 2 wherein the light beam path is projected at an angle with respect to the paper path, the angle being greater than 45 degrees from the perpendicular to the paper path.

4. In a sheet transport system for conveying a sheet along a paper path in an image reproduction system, a sheet sensor comprising a light beam path, the light beam path disposed in an interference relationship with the paper path, an optical fiber providing a portion of the light beam path, a light emitter, the light emitter disposed at one end of the light beam path for projecting a light beam along the light beam path, a light detector disposed at the other end of the light beam path, the light detector responsive to light projected along the light beam path to provide a signal, the signal depending upon the presence or absence of a sheet in the light beam path, the light beam path being projected at an angle with respect to the perpendicular to paper path.

5. The sheet transpart system claim 4 wherein the optical fiber is a fiber optic U joint for redirecting the light beam.

6. The sheet sensor claim 4 wherein the light beam path is projected at an angle with respect to the paper path, the angle being in the range of 10 to 60 degrees from the plane of the paper.

* * * * *